Dec. 27, 1949     M. P. WINTHER     2,492,776

DYNAMOELECTRIC MACHINE

Filed Aug. 11, 1948

Martin P. Winther,
Inventor.
Haynes and Koenig,
Attorneys.

Patented Dec. 27, 1949

2,492,776

UNITED STATES PATENT OFFICE 2,492,776

DYNAMOELECTRIC MACHINE

Martin P. Winther, Waukegan, Ill., assignor to Martin P. Winther, as trustee

Application August 11, 1948, Serial No. 43,750

5 Claims. (Cl. 172—285)

This invention relates to dynamoelectric machines, and more particularly to anti-creeping dynamoelectric brakes.

Among the several objects of the invention may be noted the provision of an improved dynamoelectric brake, for use where a rotary member to be braked is subject to turning forces tending to make it creep, adapted to restrain the braked member from creeping; the provision of a simple brake of the class described adapted to develop a sufficiently high static braking torque to restrain the braked rotary member from creeping away from a position of rest, without the use of friction brakes or the like; the provision of a brake of this class wherein the provision of anti-creeping means has negligible effect upon the operating characteristics of the rotary member at running speeds of the latter; the provision of a brake of this class particularly adapted for use with an eddy-current clutch to brake the driven member of the clutch and to restrain the driven member from creeping once it has stopped; and the provision of a brake such as described which is of simple and economical construction. Other objects will be in part apparent and in part pointed out hereinafter.

The invention accordingly comprises the elements and combinations of elements, features of constructions, and arrangements of parts which will be exemplified in the structures hereinafter described, and the scope of the application of which will be indicated in the following claims.

In the accompanying drawings, in which several of various possible embodiments of the invention are illustrated, Fig. 1 is a section, taken on line 1—1 of Fig. 2, of an eddy-current clutch having a brake of this invention applied thereto for braking its driven member, a drive motor being fragmentarily shown in elevation;

Similar reference characters indicate corresponding parts throughout the several views of the drawings.

It is desired that the rotary member of a dynamoelectric brake such as an eddy-current brake, once it has been stopped, shall remain in a position of rest. But in the conventional dynamoelectric brake, with the rotary member of the brake at standstill, no static braking torque is developed to maintain it stationary, with the result that the rotary member is subject to creeping under some circumstances. It has been attempted to prevent such creeping by utilizing a friction brake or the like to brake the rotary member sufficiently to resist creeping, but such a brake either must remain applied during operation of the rotary member at running speeds, or mechanical means must be provided for releasing the brake during such operation of the rotary member. Consequently, the use of such friction brakes to prevent creeping has not been wholly satisfactory. This invention provides a brake adapted effectively to prevent creeping of the rotary member to be braked, without the use of an additional friction brake or the like, and without interfering with operation of the rotary member at running speeds.

Figure 2:
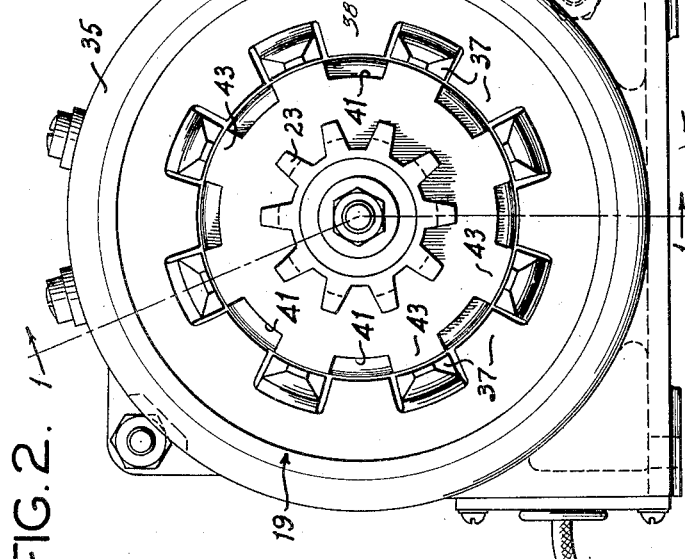
Fig. 2 is an end elevation of Fig. 1.
Figure 1:
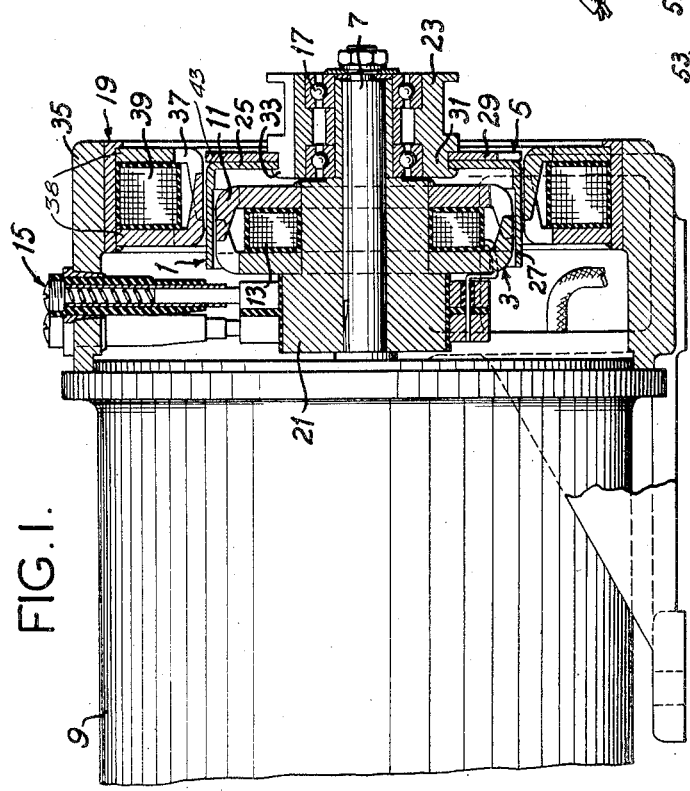

Referring to Figs. 1 and 2 of the drawings, there is shown at 1 an eddy-current clutch comprising a driving field member 3 and a driven inductor member 5. The field member is attached to the shaft 7 of an electric motor 9 and, for purposes of this description, may be assumed to be constantly driven by the motor. It is of known type, having an annular series of interdigitated poles 11 surrounding a field coil 13. Current is supplied to the field coil for energizing the clutch through slip ring and brush connections, generally indicated at 15.

The inductor member 5 is rotary relative to the field member, and is inductively driven thereby when the field member is energized. As shown, the inductor member is journalled on the end of the motor shaft 7 by means of ball bearings 17. Friction in these bearings, though of low value, tends to cause the inductor member to rotate, even when the field member of the clutch is deenergized.

Surrounding the inductor member is a braking field member 19 adapted when energized and when the inductor is rotating to induce eddy currents in the inductor and thereby to brake it. However, at very low speeds the eddy-current braking action becomes nil and when the inductor is stationary, no eddy currents whatever are induced in the rotor for braking purposes. Consequently, friction in the bearings tends to cause the inductor to creep along with shaft 7, which is constantly driven. While weak eddy currents may be induced in the inductor by the braking field member as the inductor creeps, they are so insignificant that they do not develop sufficient braking torque to overcome the tendency of the inductor to rotate. This invention involves the adaptation of the inductor to function as a magnetomotive brake member by pure magnetic attraction in association with the braking field member to develop sufficient static braking torque to prevent creeping of the inductor.

The clutch field member 3 is mounted on a hub 21 keyed on the shaft 7 adjacent the end of the motor 9. The shaft projects from the hub and has a toothed pulley 23 journalled on its end by means of the bearing 17. The pulley is adapted to be coupled by a toothed belt drive (not shown) to the apparatus to be driven by the motor. This pulley carries the inductor 5. The latter is formed as an iron drum having an uninterrupted annular portion in inductive relation both to the clutch field member 3 and the braking field member 19. It also has an annularly interrupted iron portion in inductive relation to the braking field member. As shown in Figs. 1 and 2, the inductor comprises a cup-shaped element 25 having an annular wall 27 forming the uninterrupted annular portion of the drum and a peripherally notched iron disc 29 forming the annularly interrupted portion of the drum. The disc 29 and element 25 are assembled on a hub 31 projecting from the pulley 23 and non-rotatably fixed thereon by pressing over the end of the hub 31 as indicated at 33. The annular wall 27 of element 25 extends inward from the disc toward the motor, surrounds the clutch field member 3, and is surrounded by the braking field member 19, with narrow air gaps therebetween.

The braking field member 19 is fixed within a ring 35 fixed to the case of the motor 9. It is of known type, having a field pole structure comprising an annular series of annularly spaced interdigitated poles 37 and an annular field coil 39 enveloped thereby. The poles extend axially, consecutive poles extending in opposite directions, so that when the field coil 39 is energized consecutive poles are of opposite polarity. The toroidal flux field surrounding the coil 39 thus interlinks the poles 37 and drum 27 providing for the main braking action by producing eddy currents in the drum with a resulting reactive braking flux field. The disc 29 is notched as indicated at 41 to have an annular series of poles or teeth 43 spaced at intervals corresponding to twice the spacing of the poles 37 of the braking field member. Thus, poles 43 are spaced at intervals corresponding to the spacing of alternate poles 37 of the same polarity. The arcuate extent of each pole 43 of the disc preferably corresponds to the arcuate extent of each pole 37 of the braking field member.

With the clutch field member 3 energized, and the braking field member 19 deenergized, the inductor 5 is driven by eddy-current action. The braking field member 19 is deenergized. The interrupted portion of the inductor drum provided by the notched disc 29 does not interfere with this operation of the inductor. To bring the inductor to a stop with the shaft 7 and the clutch field member continuing to rotate, the latter is deenergized and the braking field member 19 is energized. Initially, this decelerates the inductor due to eddy currents dynamoelectrically induced in the uninterrupted portion of the inductor drum.

As above noted, when the inductor has decelerated almost to a standstill, eddy-current braking action becomes substantially ineffective. However, the inductor is brought to rest and held at standstill by the magnetomotive braking action of the braking field member 19 upon the teeth 43 of the inductor. The inductor comes to rest and remains at rest, without creeping, with the teeth 43 radially aligned with alternate poles 37 of the braking field member. It will be understood that the latter poles 37 induce attracting magnetic poles of opposite polarity in the teeth 43, the action being entirely magnetomotive when the inductor is stationary. No currents, eddy or other wise, exist at this time in the members 27 or 29.

The interruption in the magnetic circuit including the braking field member and the inductor, due to the variation in the flux path resulting from the notches at the end of the inductor, has negligible effect upon the dynamoelectric braking action of the device while the inductor is rotating at relatively high speed. The interruption, however, results in the development of sufficient static braking torque to prevent creeping of the inductor. The value of the static braking torque may be varied by varying the extent of the notching of the disc 29 and also the value of current in coil 39.

Figure 4:
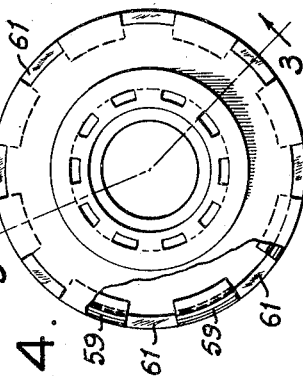
Fig. 4 is an end elevation of Fig. 3, parts being broken away and shown in section.
Figure 3:
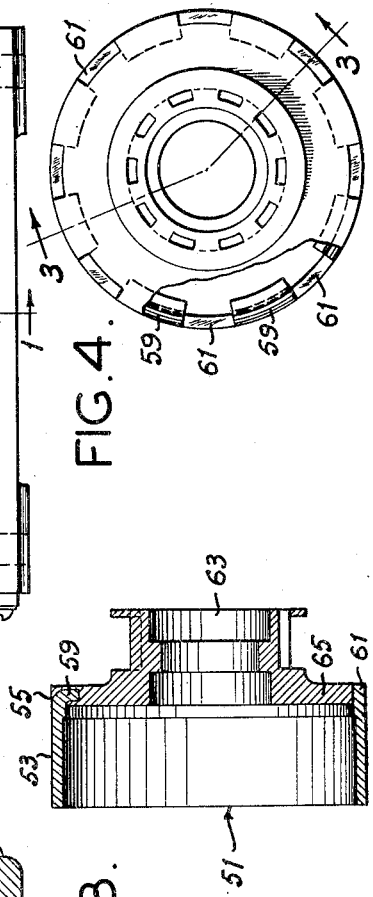
Fig. 3 is a detail section taken on line 3—3 of Fig. 4 of a modified form of inductor member for the Fig. 1 apparatus.

Figs. 3 and 4 illustrate a modification of the inductor-pulley assembly of Figs. 1 and 2. As shown, the inductor, generally designated 51, comprises a drum of magnetic and conductive material (iron) having an annularly uninterrupted portion 53 for dynamoelectric braking action and an interrupted portion 55 formed by notches in one end of the drum for magnetomotive braking action. These notches occur at places where tongues 59 are bent inward from the material at this end of the drum, and divide the end of the drum into a plurality of poles or teeth 61 corresponding to the teeth 43 of the Fig. 1 inductor. At 63 is shown a toothed pulley cast of non-magnetic material (aluminum for example) with a flange 65. The drum is fixed to the pulley by casting the pulley in place with the tongues 59 extending into the flange 65 of the pulley. This leaves the unbent poles or teeth 61. It will be understood that the inductor 51 functions in the same manner as the inductor 5.

As herein disclosed, the inductor is the rotary member of the brake, and the braking field member is fixed. It will be understood that this relationship may be reversed, the braking field member being rotary and the inductor being fixed. This is a mere inversion. Usually the inductor will be the rotary member of the brake as it is of lower mass and lower moment of inertia than the field member. While iron has been mentioned as forming the inductor, it will be understood that other materials may also be used, provided that they are conductive and magnetizable.

It will be understood that although the invention has been described in connection with a brake, it is useful between any two relatively rotary members where it is desired to bring the speed of one to the speed of the other. In the present case, the inductor 1 is brought to zero speed, which is the speed of the brake assembly. Obviously, if the speed of the brake assembly were other than zero, the same principles would apply except that the inductor would be brought into exact synchronism with that speed.

The term dynamoelectric herein refers to action involving the production of currents by the sweeping action of a field. In the case of the drum 27 these currents provide a reactive magnetic field both for driving the drum from the field member 3 or for braking it from the field member 19, The term magnetomotive refers to action involving no currents but mere magnetic attraction as between the poles 43 and 37 (or 61 and 37).

An effective feature of the invention will be seen from Figs. 1 and 2, wherein the interdigitated teeth 37 are seen to extend from magnetic rings 38 on each side of the coil 39. The root portions of the interdigitated poles 37 connect with these rings and lie in planes on opposite sides of the coil 39. It will be noted that the interrupting teeth 43 lie only in the planes of the root portions of one set of poles and do not substantially interfere with the substantially uninterrupted surface characteristic of the drum 27 opposite the remaining portions of the poles. The same is true of the interruptions 55 illustrated in Fig. 3. Thus none of the advantages of the smooth eddy-current braking action brought about by interdigitated teeth opposite substantially uninterrupted surfaces in interfered with, the teeth 43 and 55 being thus interlinked by only a small portion of the toroidal flux field which interlinks the poles 37 with the uninterrupted portions of the drums 27 or 53.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An anti-creep brake for an eddy-current dynamoelectric machine having an eddy-current member constituted by a substantially uninterrupted magnetic surface, and a field member having an annular field coil enveloped by oppositely extending interdigitated sets of magnetic poles between it and said eddy-current member, the root portions of said poles connecting with magnetic rings on opposite sides of the coil; comprising an interrupted magnetic portion only on end portions of said eddy-current member and substantially in the plane of the roots of certain of said poles and affected only by a small portion of the toroidal flux field which interlinks the poles and the eddy-current member.

2. An anti-creep brake for an eddy-current dynamoelectric machine having a drum constituted by a substantially uninterrupted magnetic surface, and a field member having an annular field coil enveloped by oppositely extending interdigitated sets of magnetic poles between it and said drum, the root portions of said poles connecting with magnetic rings on opposite sides of the coil; comprising an interrupted magnetic portion only on end portions of said drum and substantially in the plane of the roots of certain of said poles, and affected only by a small portion of the toroidal flux field which interlinks the poles and the drum.

3. An anti-creep brake for an eddy-current dynamoelectric machine having a cup-shaped drum having an enclosed end wherein the cylindric portion is constituted by a substantially uninterrupted magnetic surface, and a field member having an annular field coil enveloped by oppositely extending interdigitated magnetic poles between it and said drum, the root portions of said poles connecting with magnetic rings on opposite sides of the coil; comprising an interrupted magnetic portion only at the enclosed end of said drum and substantially in the plane of the roots of certain of said poles, and adapted to be affected by only a small portion of the toroidal flux field from said coil.

4. Apparatus constructed according to claim 3 wherein the interrupted magnetic portion is constituted by a radially toothed magnetic disc adjacent the enclosed end of said drum.

5. Apparatus constructed according to claim 3 wherein the interrupted magnetic portion is constituted by a notched end of said drum, and wherein said enclosed end of the drum is constituted by cast nonmagnetic material enveloping said notched end.

MARTIN P. WINTHER.

REFERENCES CITED

The following references are of record in the file of this patent:

UNITED STATES PATENTS

| Number | Name | Date |
| --- | --- | --- |
| 1,271,401 | Weydell | July 2, 1918 |
| 2,073,926 | Fraser | Mar. 16, 1937 |
| 2,119,819 | List | June 7, 1938 |
| 2,411,122 | Winther | Nov. 12, 1946 |

FOREIGN PATENTS

| Number | Country | Date |
| --- | --- | --- |
| 3,910 | Great Britain | of 1915 |